United States Patent
Tashiro

(10) Patent No.: US 7,603,233 B2
(45) Date of Patent: Oct. 13, 2009

(54) MAP MATCHING METHOD AND APPARATUS FOR NAVIGATION SYSTEM

(75) Inventor: Eric Tashiro, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 378 days.

(21) Appl. No.: 11/581,972

(22) Filed: Oct. 16, 2006

(65) Prior Publication Data

US 2008/0091347 A1    Apr. 17, 2008

(51) Int. Cl.
    *G01C 21/00* (2006.01)
(52) U.S. Cl. .................................. 701/214; 342/357.14
(58) Field of Classification Search ................ 701/216, 701/214; 342/357.14, 357.13
    See application file for complete search history.

(56) References Cited

U.S. PATENT DOCUMENTS 5,374,933 A * 12/1994 Kao ...................... 342/357.13
6,658,353 B2 * 12/2003 Shimizu et al. ............. 701/214
6,931,322 B2 * 8/2005 Jung et al. .................. 701/216

FOREIGN PATENT DOCUMENTS

| JP | 09-152344 | 6/1997 |
|----|-----------|--------|
| JP | 09-292249 | 11/1997 |

\* cited by examiner

*Primary Examiner*—Mark Hellner
(74) *Attorney, Agent, or Firm*—Muramatsu & Associates

(57) ABSTRACT

A map matching method and apparatus for a navigation system estimates a location of the navigation system on a correct road segment when a GPS signal is invalid. The map matching method creates a database of pairs of locations at which the navigation system encountered GPS signal loss and recovery in the first time. The navigation system conducts a map matching processing when the GPS signal is lost in the second time at the recorded location by incorporating various additional factors to match the current position with a correct road segment. The various additional factors, in addition to the measured data by a dead reckoning process, include road class, road accessibility, road angle, proximity to candidate road, etc.

16 Claims, 10 Drawing Sheets

| Route Number | Locations of GPS Signal Lost & Recovered | Frequency of Use |
|---|---|---|
| Route 1 | A (Xa, Ya), B (Xb, Yb) | 12 |
| Route 2 | C (Xc, Yc), D (Xd, Yd) | 1 |
| Route 3 | E (Xe, Ye), F (Xf, Yf) | 25 |
| Route 4 | G (Xg, Yg), H (Xh, Yh) | 0 |
| Route 5 | I (Xi, Yi), J (Xj, Yj) | 4 |

MAP MATCHING METHOD AND APPARATUS FOR NAVIGATION SYSTEM

FIELD OF THE INVENTION

This invention relates generally to a map matching method for a navigation system, and more particularly, to a map matching method and apparatus for creating a database of pairs of locations at which the navigation system encountered GPS signal loss and recovery in the first time, and for conducting a map matching processing when the GPS signal is lost in the second time at the recorded location by incorporating various additional factors to match the current vehicle position with a correct road segment.

BACKGROUND OF THE INVENTION

Navigation system are widely used today. On a monitor screen of a navigation system, typically, the current position of the vehicle and a route on which the vehicle is running are superimposed on a map image of a region in which the vehicle is currently travelling. For such a navigation system, it is essential to determine the current position as accurately as possible under various different driving conditions.

With such a navigation system, an output signal produced by a gyroscope which is indicative of changes in the vehicle travel direction is used. Namely, the output signal of the gyroscope shows amounts of angle of the vehicle with respect to a predetermined axis of the gyroscope. Each change of the angle represents a change in the travel direction of the vehicle in relation to a previously determined absolute travel direction.

The direction change information from the gyroscope is used in conjunction with distance information expressing a distance that has been traveled by the vehicle relative to a preceding estimated position of the vehicle. Typically, distance information is obtained based on an output signal from a vehicle speed sensor. The direction change information and the distance information are used to perform a "dead reckoning" processing to obtain the estimated current position and travel direction of the vehicle.

Although the sensors (gyroscope and speed sensor) of the vehicle are able to obtain relative position values with respect to the previous position, it is not possible to obtain absolute position values. Furthermore, the measurement by the gyroscope is based on detecting values of angular velocity of rotation about the predetermined axis of the gyroscope. When the axis does not accurately correspond to the axis about which the vehicle actually rotates, error will be involved in detecting the change of direction. Further, the signal produced from the gyroscope may include an offset even when an angular velocity is zero and such an offset varies due to various factors. Because of the above reasons, errors may arise in determining an amount of change in the vehicle travel direction, and the accuracy of detecting the current position of the vehicle will thereby be impaired. The errors will be accumulated by time, i.e., the longer the time, the larger the errors.

Because of the inaccuracy involved in the dead reckoning processing based on the on-board sensors, i.e., the gyroscope and speed sensor described above, the detected position is periodically corrected by the position measurement data calculated based on GPS signals from GPS satellites. Typically, absolute positions and corresponding travel directions of the vehicle derived from the GPS signals can be obtained at every one second (1 Hz). Because of noises contained in the GPS signals, the position data obtained from the GPS signals also contain errors, for example, about 100 meter radius.

The corrected vehicle position and travel direction estimates derived in the foregoing are combined to obtain an estimate of the path (road segment) which has been traveled by the vehicle up to the current position. The estimated travel path is applied to map data in a map matching processing. The path is compared with data expressing a road map of a region in which the vehicle is currently travelling, thereby further increasing the accuracy of a finally estimated current position of the vehicle. In this manner, it is possible to accurately display the route and the current position of the vehicle on the route.

However, appropriate GPS signals may not always be available, for example, in a downtown area with many tall buildings where GPS signals are reflected and interfered by the buildings. In another example, when a vehicle is in a valley between tall mountain walls, the minimum number of visible GPS satellites may not be available. In such a situation where the GPS signals are lost or insufficient, the position errors will be accumulated because the navigation system has to rely solely on the dead reckoning process.

FIG. 1 is a schematic diagram showing an example of situation where GPS signals may become invalid because of the tall buildings in a downtown area of a city. Since the GPS navigation requires the minimum number of visible GPS satellites, sufficient GPS signals may not be available depending on particular locations in such a downtown area. Generally, since GPS satellites stay in the same locations in the sky, such problems as GPS signal loss will happen at the same locations in the city.

FIG. 2 shows such a situation when a vehicle is travelling a downtown area in which a GPS signal is lost at a location A and is recovered at a location B. Thus, during that period, the navigation system has to rely solely on the dead reckoning processing. Because the error will be accumulated during the dead reckoning processing as noted above, even when the vehicle moves on the road indicated by the arrows in FIG. 2, the position Pd of the vehicle estimated by the navigation system may on the trace indicated by the dotted line. Then, by the map matching processing, the navigation system interprets that the vehicle position Pm is on the road segment indicated by the dotted line which is the street next to the street on which the vehicle is actually running.

Thus, every time when the user drives along the route indicated by the arrows in FIG. 2 for commuting to his office, for example, the navigation system may indicate the current vehicle position on the wrong road. Therefore, there is a need of a map matching method and apparatus for a navigation system which is able to more accurately estimate a position of a vehicle when a GPS signal is lost or otherwise unavailable.

SUMMARY OF THE INVENTION

It is, therefore, an object of the present invention to provide a map matching method and apparatus for a navigation system which is capable of more accurately estimating a current position of a vehicle when a GPS signal is lost or otherwise invalid.

In the present invention, the map matching method and apparatus for a navigation system estimates a location of the navigation system on a correct road segment when a GPS signal is invalid. The present invention creates a database of pairs of locations at which the navigation system encountered GPS signal loss and recovery in the first time. The navigation system conducts a map matching processing when the GPS signal is lost in the second time at the recorded location by incorporating various additional factors to match the current position with a correct road segment. The various additional factors, in addition to the measured data by a dead reckoning process, include road class, road accessibility, road angle, proximity to candidate road, etc.

One aspect of the present invention is a method for estimating a current position of a vehicle on a correct road segment when GPS signals are unavailable. The method includes the steps of recording a pair of locations where a GPS signal was lost and recovered in a memory when a user of a navigation system newly encounters GPS signal loss and its recovery, comparing a current location of the user with the locations recorded in the memory and retrieving the pair of locations when the user is approaching the location where the GPS signal was previously lost, selecting one or more candidate routes between the pair of locations retrieved from the memory when the user experiences the GPS signal loss in a second time by extrapolating between the pair of locations, estimating a route out of the candidate routes which is most likely that the user is taking based on measured data through a dead reckoning process in addition to predetermined factors, and map matching a current location of the user with a road segment on the estimated route derived from a map database of the navigation system. The predetermined factors include, in addition to proximity with a road, at least a road class which indicates a type of road.

The present invention creates the database of pairs of locations where the GPS signal was lost and recovered by repeating the step of recording the pair of locations in the memory every time when the navigation system newly encounters GPS signal loss. Each location where the GPS signal was lost and the GPS signal was recovered is recorded in the database by longitude and latitude data. The database includes data showing a number of times that each pair of locations where the GPS signal was lost and the GPS signal was recovered have been used so far for the map matching.

In the present invention, the predetermined factors for estimating the route further include a speed range associated with a particular road class. Further, the predetermined factors for estimating the route further include accessibility of a road which at least includes distinction whether a particular road is one-way or not. Furthermore, the predetermined factors for estimating the route further include an angle of road.

Another aspect of the present invention is an apparatus for estimating a current position of the navigation system by creating the database of pairs of locations at which the navigation system encountered GPS signal loss and recovery in the first time, and conducting the map matching processing when the GPS signal is lost in the second time at the recorded location by incorporating various additional factors to match the current position with a correct road segment derived from map database of the navigation system.

According to the present invention, the map matching method and apparatus is able to accurately match the current vehicle position on the correct road segment. Thus, the map matching method of the present invention can avoid erroneous display of the current vehicle position on the wrong road even when the GPS signals are invalid for a relatively long period of time.

DETAILED DESCRIPTION OF THE INVENTION

The map matching method in the present invention is explained with reference to the accompanying drawings. The present invention provides a map matching method and apparatus that enables to accurately estimate a current position of the vehicle when sufficient GPS signals are not available. The present invention predicts the path (road segment) that the user is most likely to take and prioritize the predicted path when performing a map matching processing to determine the current location on the map.

Figure 1:
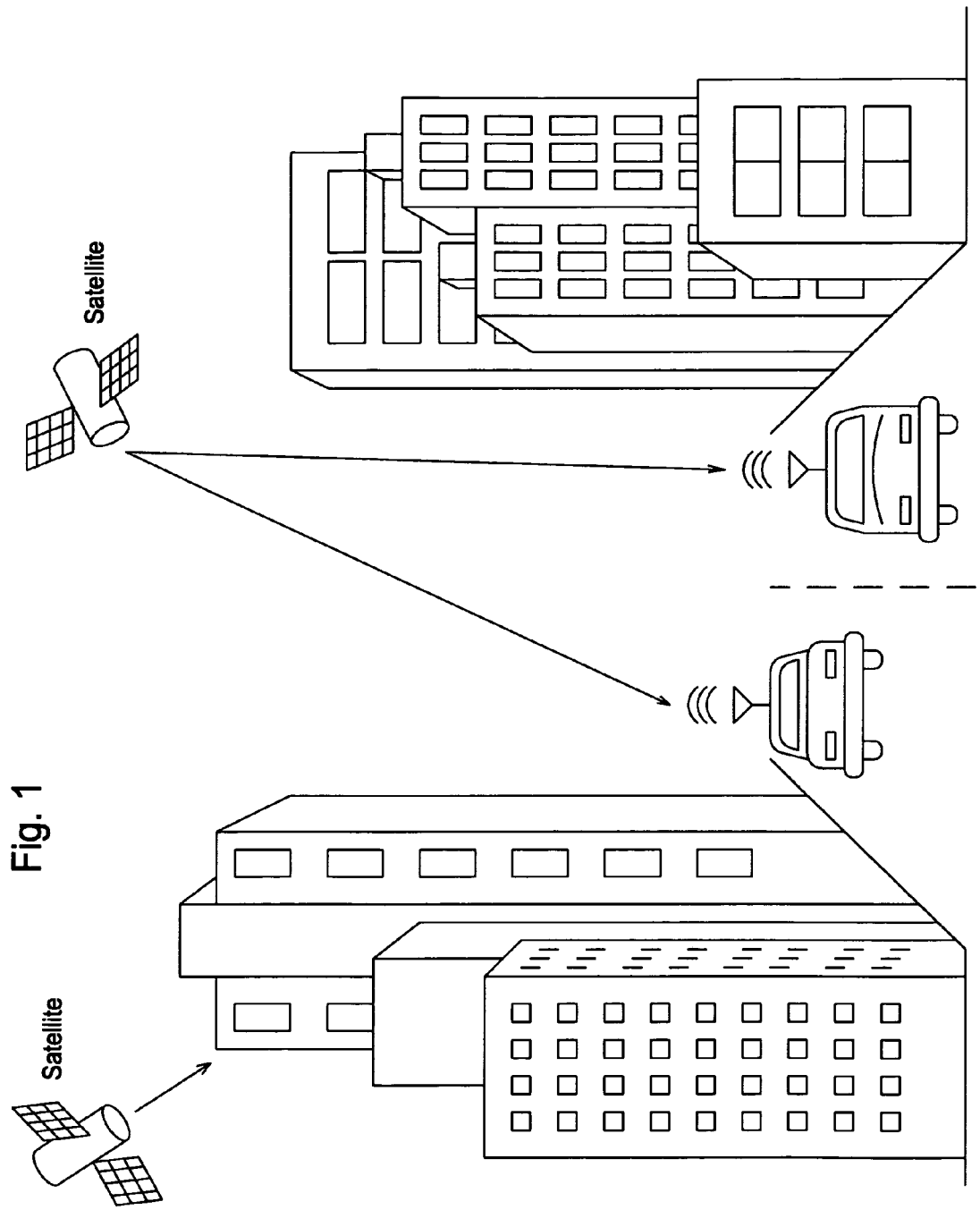
FIG. 1 is a schematic diagram showing an example of situation where GPS signal may be lost because of the tall buildings in a downtown area of a city.
Figure 2:
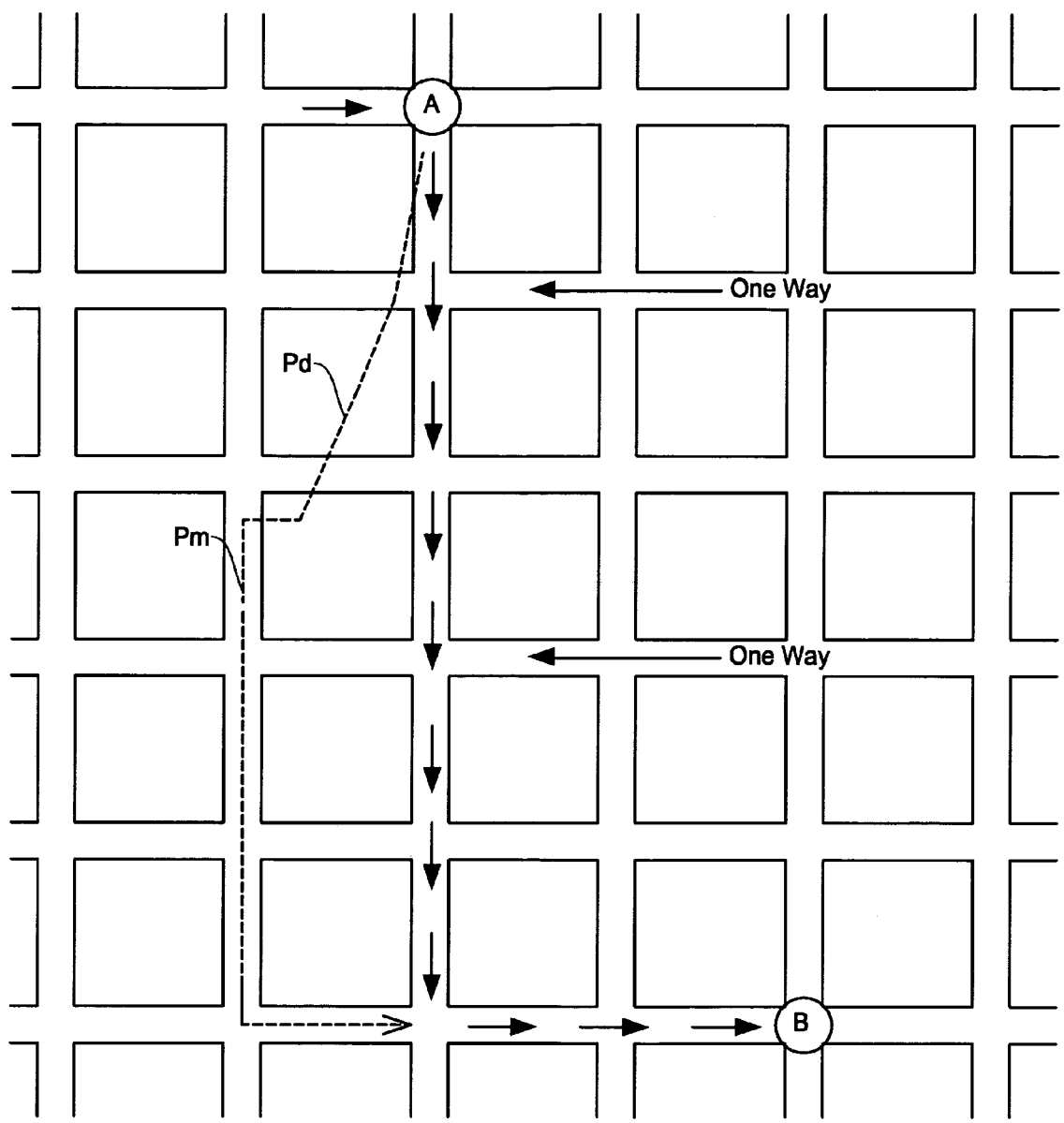
FIG. 2 is a schematic diagram showing an example of situation where GPS signals are lost at a location A and recovered at a location B so that the navigation system has to rely solely on the dead reckoning processing during the locations A and B.
Figure 3A:
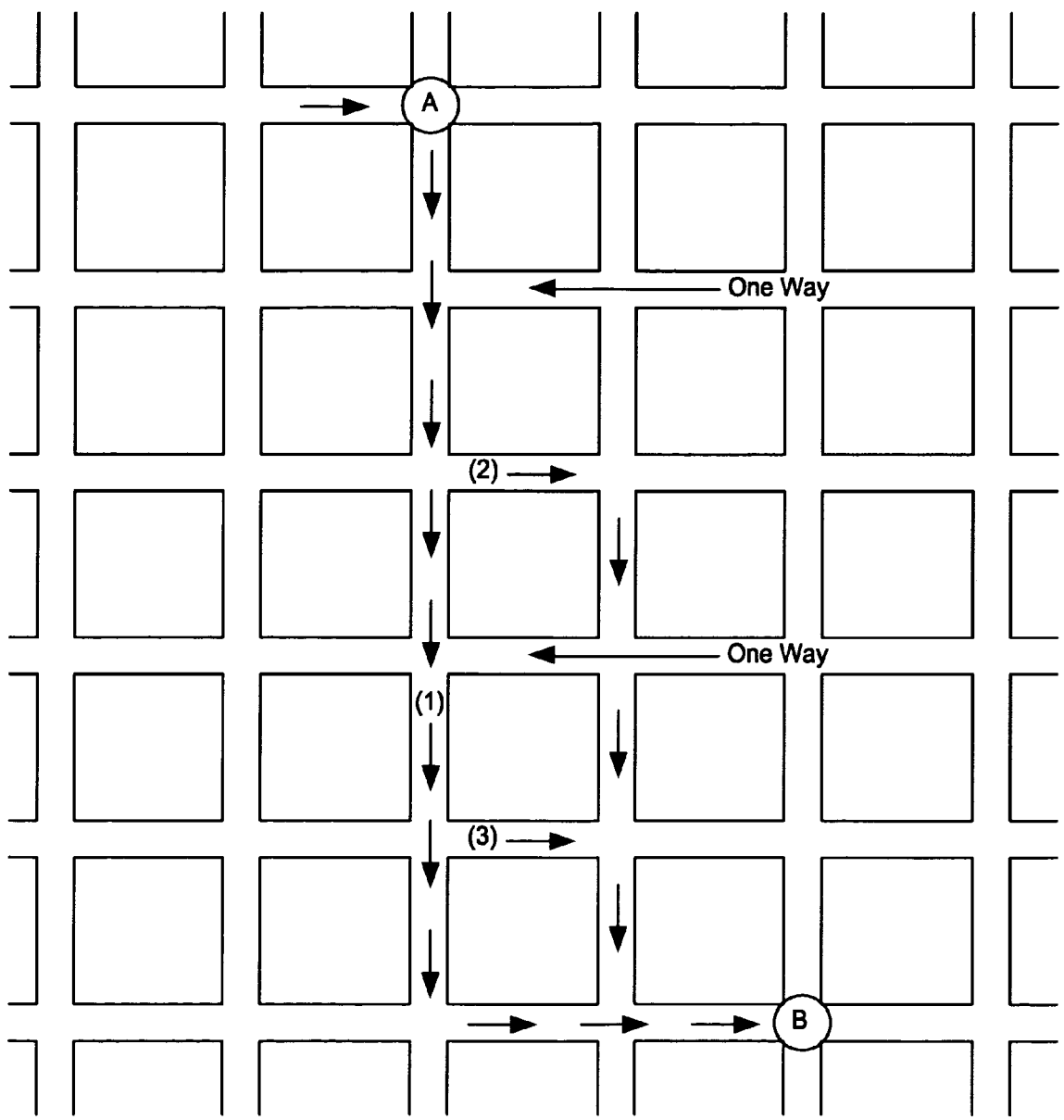
FIGS. 3A and 3B are schematic diagram showing the situation similar to that of FIG. 2 except that the map matching method prioritizes a road segment that is most likely being used by the user when the GPS signal is lost.
Figure 3B:
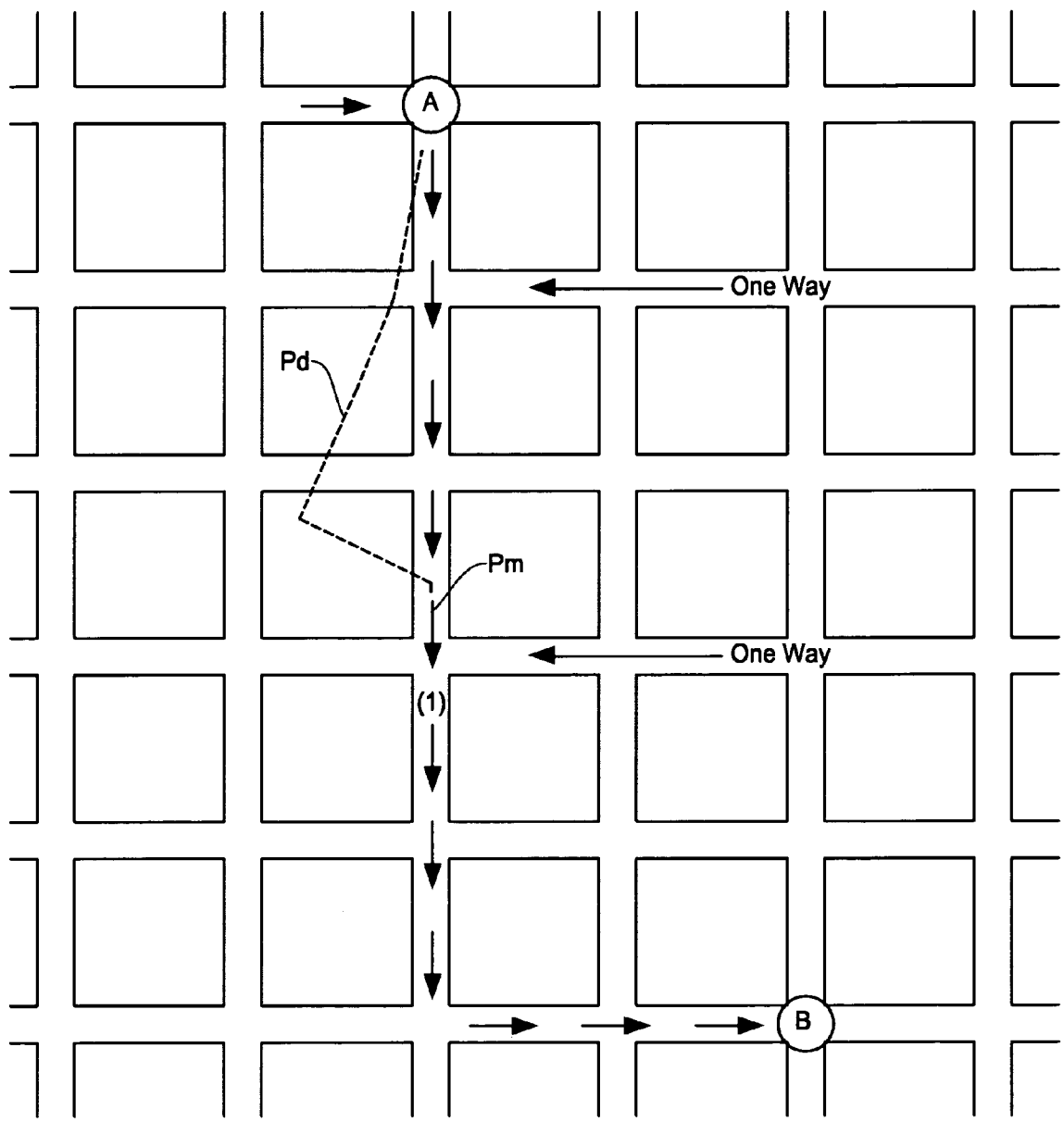

FIGS. 3A and 3B are schematic diagrams showing a basic principle of operation in the map matching method and apparatus of the present invention for the same condition as that of FIG. 2. During the period when the GPS signal is lost, the present invention so operates that the errors accumulated by the dead reckoning will not adversely affect the map matching. This can be achieved in such a way that the map matching method constantly checks the route that is most likely being used and prioritizes the most likely route over a route found by a simple proximity method of a conventional map matching.

Figures 7A, 7B:
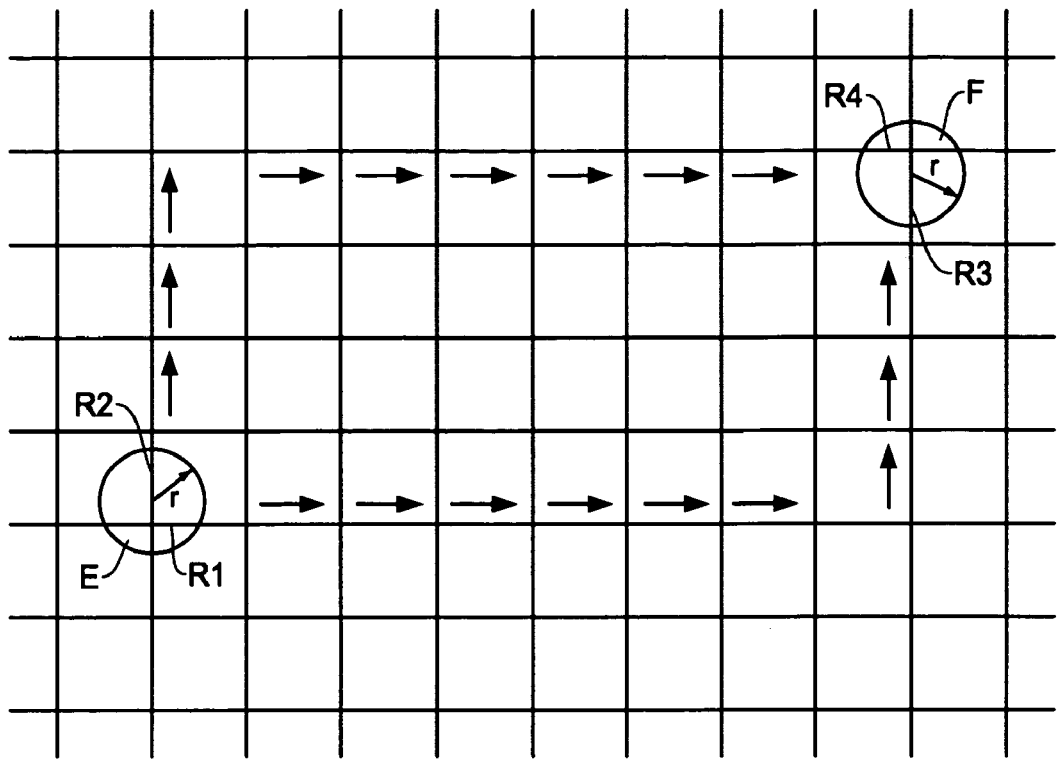
FIG. 7A is a schematic diagram showing an example of method for determining road segments associated with the locations where a GPS signal is lost and recovered.
FIG. 7B is a schematic diagram showing an example of database storing each occurrence of GPS signal loss in which a pair of absolute locations where the GPS signal is lost and recovered are stored.

When the navigation system encounters the situation as shown in FIG. 2 in the first time, the map matching method records a pair of locations where the GPS signal was lost and the GPS signal was recovered. In the example of FIG. 2, the map matching method of the present invention stores the latitude and longitude data indicating an absolute position A where the GPS signal is lost and an absolute position B where the GPS signal is recovered in a memory. Since a GPS receiver of the navigation system constantly produces the measured data showing the position of the vehicle, such latitude and longitude data can be obtained with use of the road segment data which also include the latitude and longitude data in the map data (FIG. 7A).

Every time when the navigation system newly experiences such a situation of GPS signal loss and recovery, the map matching method stores the latitude and longitude data indicating a pair of locations (where a GPS signal was lost and the GPS signal was recovered) to create a database. The latitude and longitude data stored in the database is used to estimate the most likely route on which the vehicle is running. The estimated most likely route is prioritized over the route estimated by traditional map matching (proximity matching). An example of database is shown in FIG. 7B which will be described later.

FIG. 3A shows a situation where, in the next occasion, the vehicle (navigation system) is approaching the location A where the GPS was lost in the past. Such a case typically happens when the user commutes to his office with use of the same route or the user repeatedly visits the same clients. Since the map matching method of the present invention constantly compares the current location of the vehicle with the latitude and longitude data stored in the database of FIG. 7B, it is able to detect whether the vehicle is approaching the location A recorded in the database.

Preferably, when the vehicle is approaching the location A, the map matching method initiates a more inclusive storage (ex., high repetition rate, high resolution) of data including current vehicle location, GPS locations, speed sensor (speed pulse) information, gyroscope offset data, angle change data, etc. While such an inclusive storage of various data is preferable for higher accuracy of route estimation, it is also possible to implement the present invention by acquiring the above data in the same frequency and resolution as in the normal operation.

In FIG. 3A, it is assumed that the GPS signal is lost at the location A again and the vehicle is travelling toward the location B. Based on the various measured data acquired when the vehicle is travelling between the location A and the location B, the navigation system estimates the current location of the vehicle through the dead reckoning process and the current road on which the vehicle is running through the map matching process.

For estimating the road on which the vehicle is most likely running, various other factors are also considered in addition to the measured data (dead reckoning) noted above. Such factors include road class (line classification), road accessibility, road angle, proximity to candidate road, etc. Namely, when determining a route through a map matching process, these additional factors are considered with predetermined weights. The route (road segment) determined in this manner is prioritized over a route that may be matched by the conventional map matching.

The road class means a type of road, for example, freeway (class 1), highway (class 2), local road (class 3), etc. If the vehicle was running on a certain class of road immediately before the GPS signal is lost, the map matching method estimates that the vehicle is running on the same class of road. Further, the map database of the navigation system usually include speed range information for each class of road. Thus, based on the vehicle speed measured by the speed sensor, the map matching method estimates that the vehicle is running on the class of road that allows the current speed of the vehicle.

The road accessibility indicates whether a particular road is accessible by the vehicle. For example, if a particular road is a one way road which is in the direction opposite to the moving direction of the vehicle, the map matching method estimates that the vehicle is not running on this particular road. The road angle refers to the angle between current road segment to the next road segment. If the current road segment is connected to two road segments, unless the angle information from the gyroscope clearly so indicates, the map matching method estimates that the vehicle is running on the next road segment of smaller angle with respect to the current road segment. In other words, the map matching method predicts that the user will not make a big turn unless the angle information so indicates. The proximity to candidate road is a nearness factor which is a primary factor in the traditional map matching method. In the present invention, the proximity to the candidate road is one of many factors to estimate the most likely road.

In using these factors, the map matching method of the present invention examines the candidate routes to determine the most likely route. In the example of FIG. 3A, the routes (1) to (3) indicated by arrows are candidate routes selected by the map matching method by extrapolating the locations between A and B. The routes (1) to (3) are selected as routes of higher likelihood that the user will take. With use of the measured data (dead reckoning data) in addition to the above noted various factors, the map matching method of the present invention determines the road among the candidate routes on which the vehicle is most likely running.

Thus, in FIG. 3B, the map matching method correctly matches the road on the route (1) even though the error is accumulated. Namely, during the period when the valid GPS signal is unavailable, the navigation system has to rely solely on the dead reckoning processing. The error will be accumulated during the dead reckoning processing, thus, the estimated position Pd of the vehicle may be on the dotted line. However, even though the vehicle position estimated by the dead reckoning process is closer to the street next to the road actually used, the map matching process of the present invention matches the vehicle position Pm on the road segment on the route (1). This is achieved because the map matching method incorporates the additional factors such as road class, accessibility, angle, etc., noted above.

Figure 4:
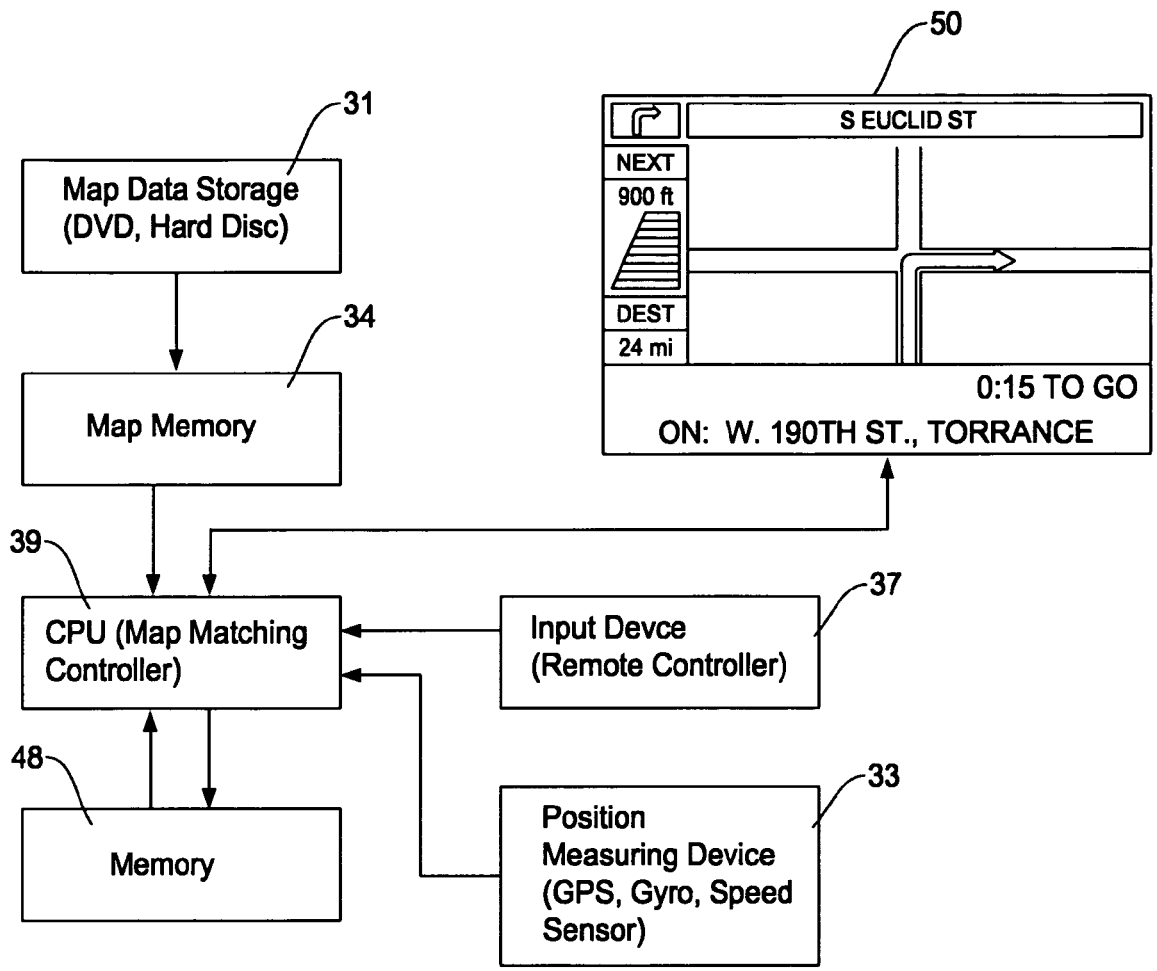
FIG. 4 is a schematic block diagram showing an example of basic structure of a map matching apparatus for a navigation system of the present invention.

FIG. 4 shows an example of simplified structure of the navigation system for performing the map matching in accordance with the present invention. The apparatus of FIG. 4 includes a map storage medium (map data storage) 31 such as a DVD or hard disc, a map memory 34, a position measuring device 33, an input device 37 such as a remote controller, a CPU 39 (map matching controller), a memory 48, and a monitor 50. The position measuring device 33 includes a GPS receiver, a speed sensor, and a gyroscope for calculating a current position of a vehicle.

The map storage medium 31 includes a map database which encompasses, for example, all over the country. The map memory 34 extracts the map information from the map storage medium 31 repeatedly by an amount necessary for processing the map information such as a sufficient amount of road segment data and for displaying the map image surrounding the current vehicle position. An image based on the map information is displayed on the monitor 50.

During the operation of the navigation system, if the GPS signal is lost at a certain location and is recovered at another location, the CPU 39 controls the navigation system to store the data indicating the two locations in the memory 48. Every time when the navigation system newly experiences such a situation of GPS signal loss and recovery, the CPU 39 causes the memory 48 to store the latitude and longitude data indicating a pair of locations (where a GPS signal was lost and recovered) to create a database. The CPU 39 constantly compares the current location of the vehicle detected by the position measuring device 33 with the latitude and longitude data stored in the database. Thus, when the vehicle is approaching the location where the GPS signal was lost in the past, the CPU 39 starts the map matching method noted above by incorporating the specific factors (road class, angle, accessibility, proximity, etc.) in addition to the measured data based on the dead reckoning processing.

Figure 5:
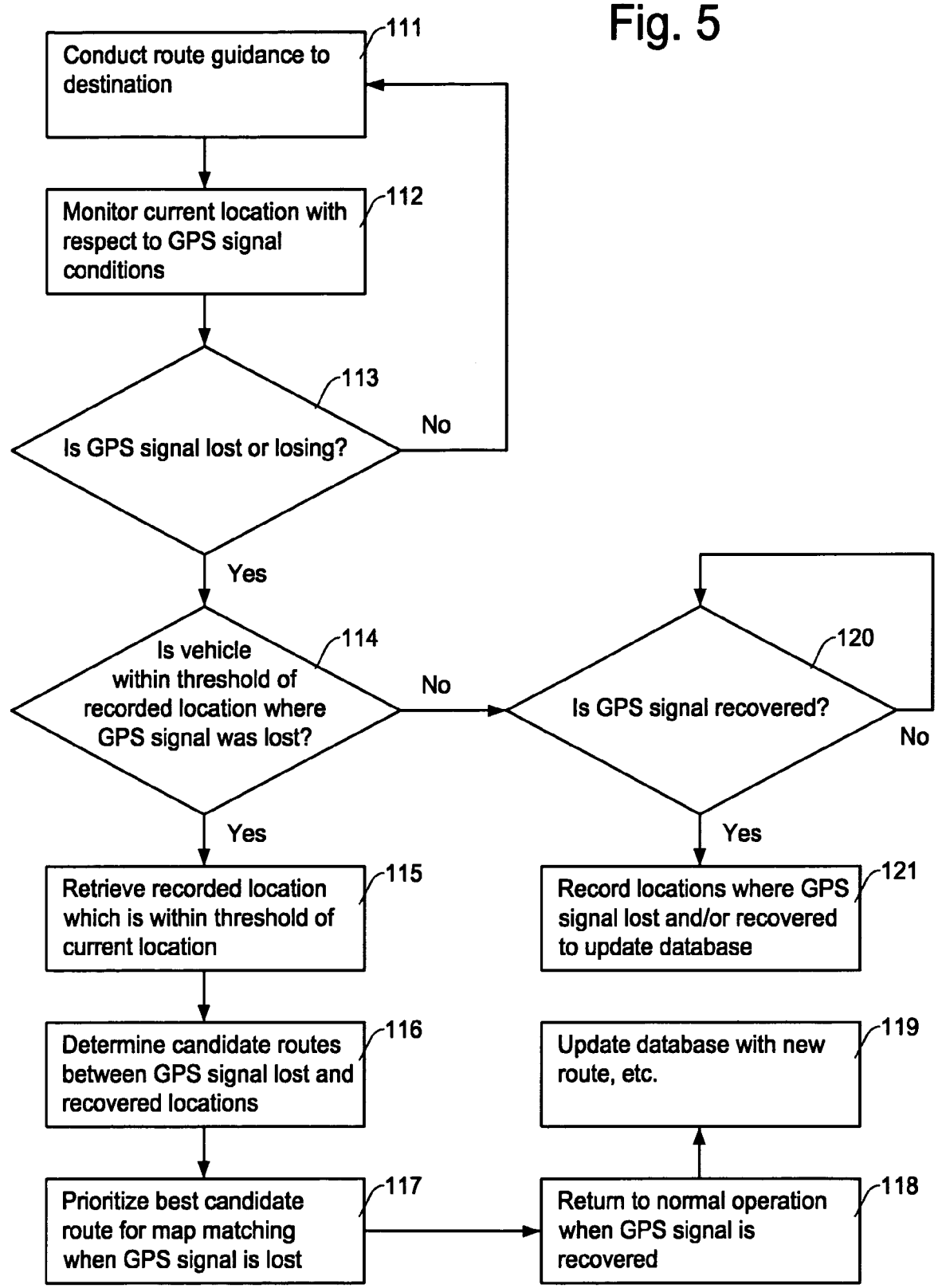
FIG. 5 is a flow chart showing an example of operation of the map matching method of the present invention for compensating possible errors that may occur by the dead reckoning processing when the GPS signal is lost.

Referring to the flow charts in FIG. 5, the basic operational steps of the navigation system for performing the map matching method of the present invention is described. In the step 111, the navigation system conducts the route guidance operation to the destination using GPS signals, etc. During the route guidance operation, the navigation system constantly monitors the current location and the GPS signal conditions in the step 112. The navigation system checks whether the GPS signal is lost or losing in the step 113. If there is no loss of GPS signal, the navigation system resumes the normal route guidance operation while repeating the foregoing steps 111-113.

As noted above, GPS signal loss typically happens at the same location because the particular shape and height of buildings causes the number of visible GPS satellites becomes less than the minimum required number. If the user uses the same route repeatedly to commute to the office or visiting his/her clients, such GPS signal loss and recovery will be repeated at the same locations. Since the absolute position of the vehicle by GPS is unavailable during this period, the error by the dead reckoning process will be accumulated. Thus, without the present invention, the navigation system may show the vehicle on the wrong road because the map matching selects the wrong road as shown in FIG. 2.

In the step 113, if it is determined that the GPS signal is lost or losing, the process moves to the step 114 where it is determined whether the current location of the vehicle is the same or within a predetermined threshold of the previously recorded locations stored in the database. As noted above, the database stores the information indicating the locations where the GPS signal was lost and recovered in the past. As will be described later, the even though the current position is not the same as that recorded in the database, the present invention utilizes the recorded locations when the current location is within the predetermined threshold range (ex. 100 meter radius) of the recorded location.

Thus, if it is determined that the current position is the same or within the threshold range of the recorded location in the step 114, the navigation system starts the map matching method of the present invention. As noted above, the map matching method incorporates the various factors (road class, angle, accessibility, proximity, etc.) in addition to the measured data based on the dead reckoning processing to determine which road to match. Thus, in the step 115, the navigation system retrieves the pair of locations from the database where one of the location is the same or within the threshold range of the current location.

In the step 116, based on the two locations where the GPS signal was lost and recovered, the navigation system determines one or more candidate routes connecting the two locations. Although it is also possible that the navigation system considers all of the routes that can connect the two locations, it is a waste of time and computer power to consider the unlikely routes as well. In the step 117, for the candidate routes, the navigation system applies the various factors (road class, accessibility, proximity, etc.) to determine which route or road segment should be selected for the map matching.

Thus, the navigation system is able to correctly match the current vehicle position on the road segment of the candidate route even though the error is accumulated during when the GPS signal is unavailable. Namely, even though the vehicle position estimated by the dead reckoning process is closer to the next street, the map matching process matches the vehicle position on the correct road segment. When the GPS signal is recovered, in the step 118, the navigation system returns to the normal operation because the errors accumulated by the dead reckoning process can be corrected by the absolute position obtained by the GPS receiver. Because the absolute position can be accurately known in the step 118, the process updates the database in the step 119 by incorporating the data obtained during the steps 116 and 117 noted above.

In the step 114 noted above, if it is determined that the current position is not the same or within the threshold range of the recorded location, it is not possible to utilize the recorded locations in the database. In other words, since the current location is a new location of GPS signal loss, the navigation system has to guide the user based solely on the dead reckoning process. Thus, in the step 120, the navigation system checks whether the GPS signal is recovered. If the GPS signal is recovered, the new information regarding the locations where the GPS signal was lost and recovered is stored in the database in the step 121. The new information in the database can be used in the next time when the navigation system encounters the GPS signal loss in the same or similar location.

Figure 6:
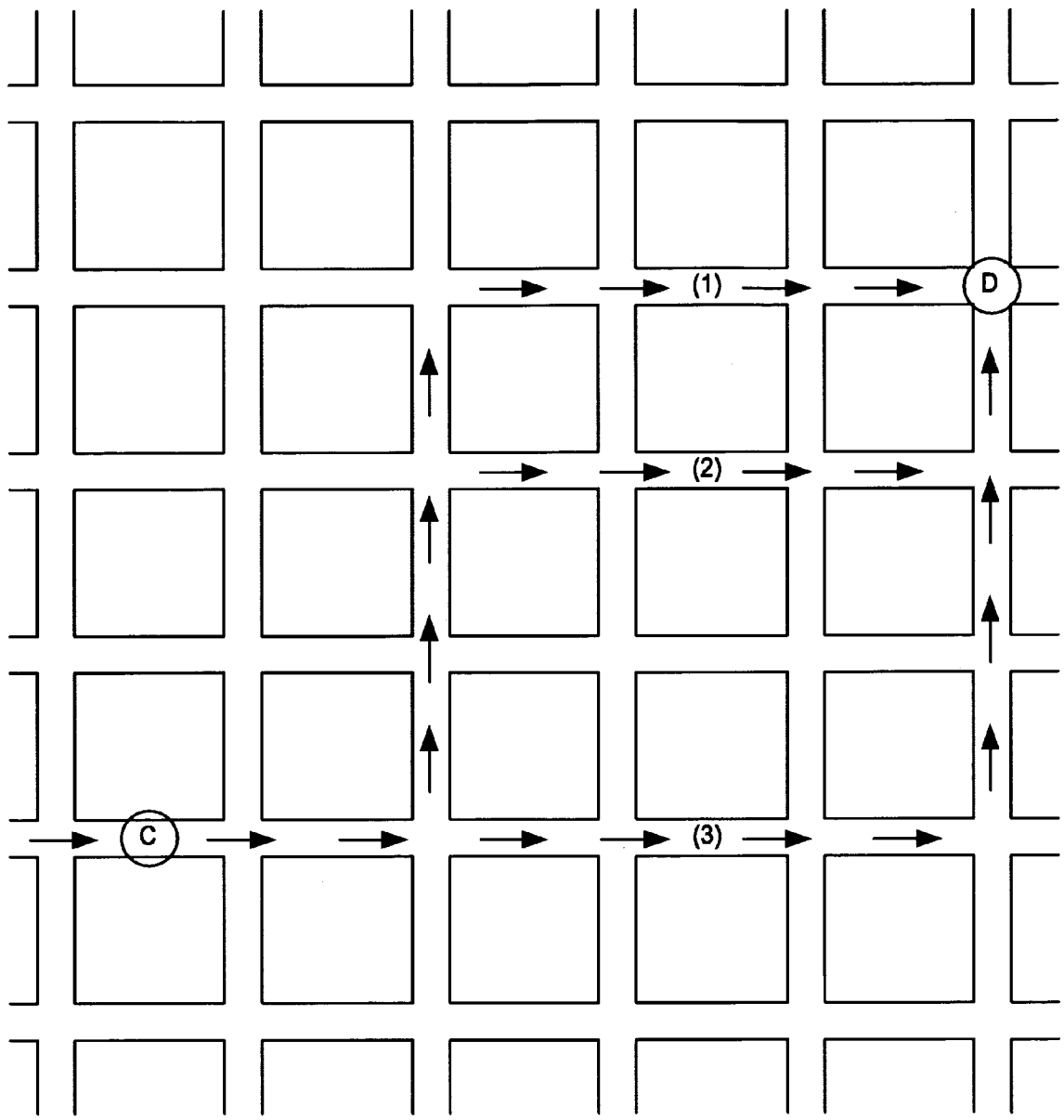
FIG. 6 is a schematic diagram showing another example of situation where a GPS signal is lost at a location C and recovered at a location D and the map matching method of the present invention estimates the most likely route that the user takes between the locations C and D.

FIG. 6 is a schematic diagram showing another example of situation where GPS signals are lost at a location C and recovered at a location D. As noted above, if this is the first time event, the map matching method simply stores the data indicating the absolute positions where the GPS signal is lost and recovered. The data showing such a pair of positions is stored in the memory to create the database such as shown in FIG. 7B. In the next time when the vehicle comes close to the location C where the GPS signal was lost in the past, the map matching method of the present invention determines candidate routes (1)-(3) that should be extrapolating between the locations C and D. The map matching method estimates the most likely route that the user will take between the locations C and D and matches the current vehicle position on the estimated route.

FIG. 7A is a schematic diagram showing an example of method for determining road segments associated with the locations where a GPS signal is lost and recovered. In this example, in considering the accuracy of the absolute location by GPS receiver which is for example 100 meter in radius, the map matching method selects road segments within the 100 meter radius for recording the pair of locations (GPS signal lost and recovered). In FIG. 7A, at the location E where the GPS signal is lost, within the radius r, both road segments R1 and R2 exist. Similarly, at the location F where the GPS signal is recovered, within the radius r, both road segments R3 and R4 exist. Thus, in this case, two pairs of locations will be detected from the map database showing the absolute location of each of the road segments and stored in the database.

FIG. 7B is a schematic diagram showing an example of database storing each new occurrence of GPS signal loss in which a pair of absolute locations where the GPS signal is lost and recovered is stored. As shown in FIG. 7A, the absolute position of the road segments within the 100 meter radius range will be stored in the database. In the example of FIG. 7B, the database is configured by a route number (route ID), longitude and latitude data indicating the pair of absolute positions where the GPS signal was lost and recovered, and frequency data showing the number of times that the pair of locations have been used for the map matching operation in the past.

The route number (route ID) can be any form in the database. The longitude and latitude data indicating the pair of absolute positions can be derived from the map data because map data of the navigation system includes such longitude and latitude data for each road segment. Typically, the higher the number in the frequency data, the more reliable it becomes the position data for the map matching operation. Thus, in the case where the two similar pairs of the locations are recorded in the database as in the case of FIG. 7A, it is preferable to select the pair of locations with the higher number of frequency.

Figure 8A:
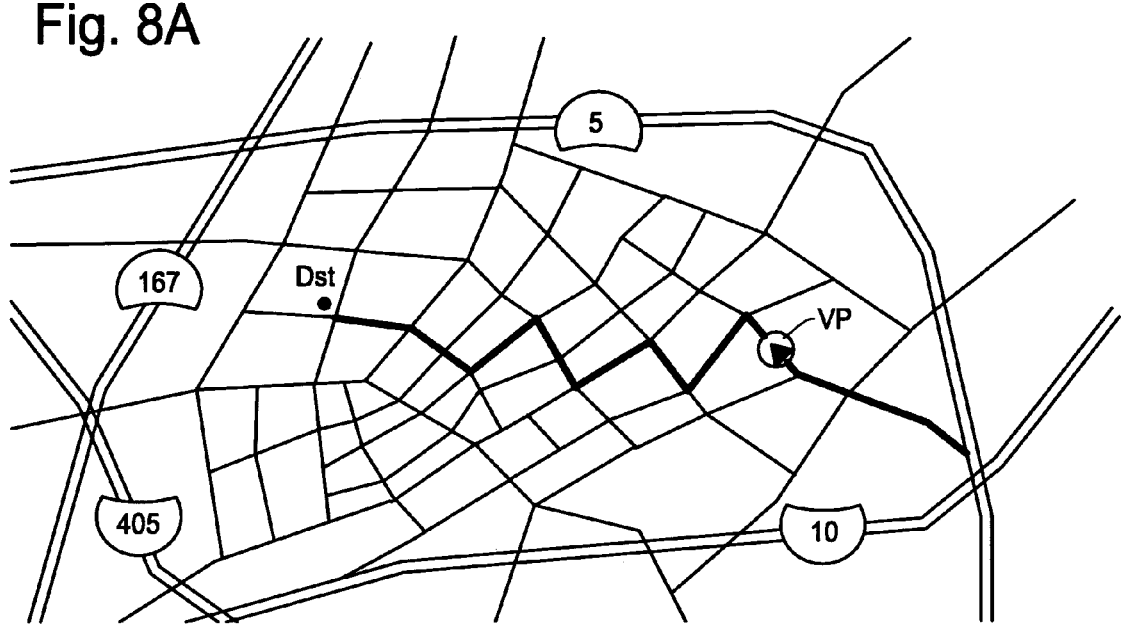
FIGS. 8A and 8B are schematic diagrams showing the situation where the navigation system is in a route guidance mode and a calculated route to the destination includes locations where the GPS signal loss occurred in the past.
Figure 8B:
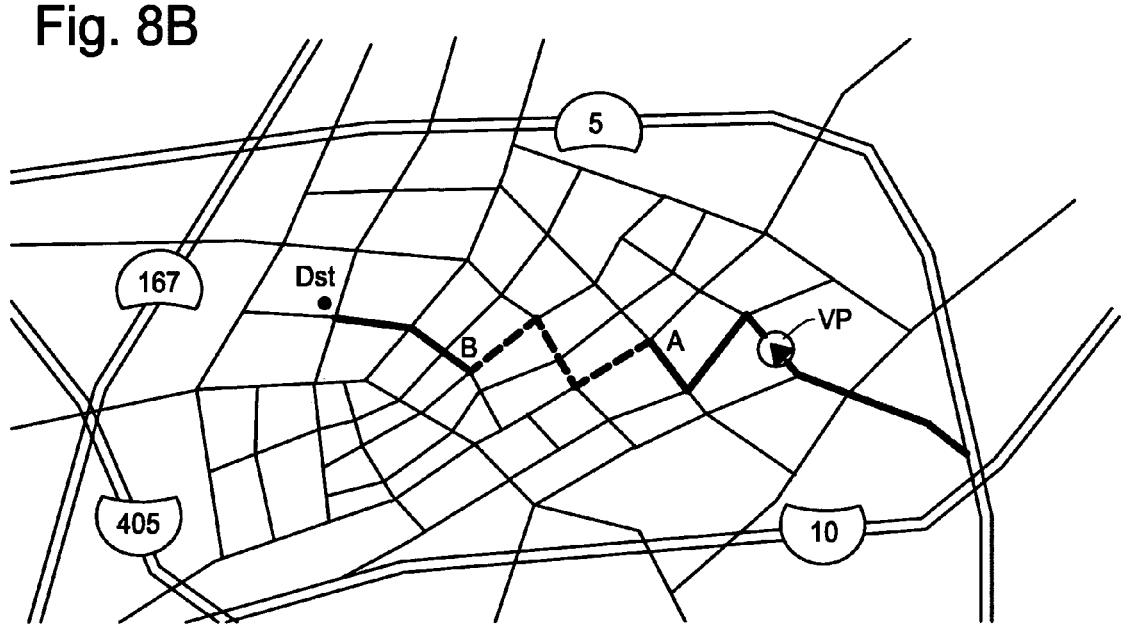

FIGS. 8A and 8B are schematic diagrams showing the situation where the navigation system is in a route guidance mode. The map matching method of the present invention can be used either with a locator map mode in which the navigation system displays the road map on which the current vehicle position is indicated or with a route guidance mode in which the navigation system guides the driver on the calculated route to the destination. In the route guidance mode, if the calculated route to the destination includes locations where the GPS signal loss occurred in the past, the map matching method of the present invention described above can be advantageously applied.

In FIGS. 8A and 8B, the calculated route to the destination Dst is illustrated by thick lines on the map image and the current vehicle position VP is indicated on the calculated route. In the normal situation where the GPS signals are valid, the current vehicle position VP estimated by the dead reckoning processing is corrected before the map matching operation by the absolute position data derived from the GPS receiver. In the case where the database of FIG. 7B indicates that the GPS signal was lost at the location A and was recovered at the location B in the past as shown in FIG. 8B, it is likely that the GPS signal loss will happen again at the same location.

Thus, when the vehicle is approaching the location A, the navigation system starts the map matching method of the present invention. During the route between the locations A and B, when the GPS signal becomes invalid again, the navigation system applies the map matching method of the present invention. By incorporating the additional factors (road class, accessibility, proximity, etc.) noted above, the map matching method estimates the most likely route on which the vehicle is running and matches the current vehicle position on the estimated route.

Figure 9:
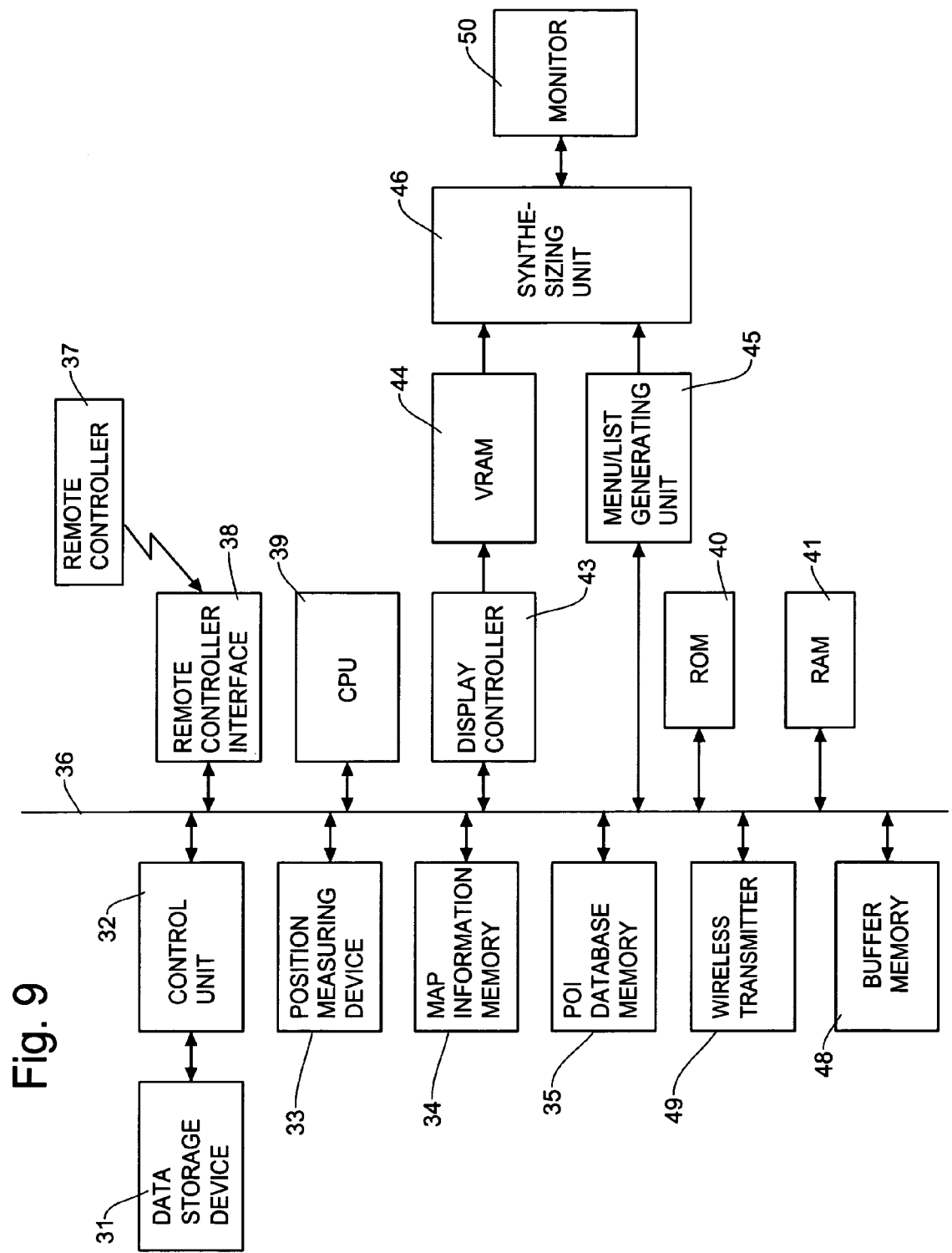
FIG. 9 is a block diagram showing an example of configuration of a vehicle navigation system implementing the map matching method of the present invention.

FIG. 9 shows a structure of a vehicle navigation system for implementing the present invention. While the vehicle navigation system is explained for an illustration purpose, the present invention can also be applied to other types of navigation system. For example, the present invention can be applied to a portable navigation device implemented by a PDA (personal digital assistant) device, other hand-held devices such as a wireless telephone, or a laptop or notebook computer.

In the block diagram, the navigation system includes a map storage medium (data storage device) 31 such as a CD-ROM, DVD, hard disc or other storage means (Hereafter "DVD") for storing map data. Alternatively, such map data can be provided to the user from a remote server through a communication network such as Internet. The navigation system includes a DVD control unit 32 for a controlling an operation for reading the map information from the DVD 31.

The navigation system includes a position measuring device 33 for measuring the present vehicle position or user position. For example, the position measuring device 33 has a vehicle speed sensor for detecting a moving distance, a gyroscope for detecting a moving direction (angle), a microprocessor for calculating a position, a GPS (Global Positioning System) receiver for measuring the absolute location of the vehicle with use of GPS signals from GPS satellites, and etc.

The block diagram of FIG. 9 further includes a map information memory 34 for storing the map information which is read from the DVD 31, a database memory 35 for storing database information such as point of interest (POI) information which is read out from the DVD 31, an input device 37 such as a remote controller for executing a menu selection operation, an enlarge/reduce operation, a destination input operation, etc. and a remote controller interface 38.

In FIG. 9, the navigation system further includes a bus 36 for interfacing the above units in the system, a processor (CPU) 39 for controlling an overall operation of the navigation system. The CPU 39 also conducts the map matching method of the present invention. The navigation system further includes a ROM 40 for storing various control programs such as a route search program and a map matching program of the present invention.

The navigation system further includes a RAM 41 for storing a processing result such as a guide route, a display controller 43 for generating map image on the basis of the map information, a VRAM 44 for storing images generated by the display controller 43, a menu/list generating unit 45 for generating menu image/various list images, a synthesizing unit 46, a memory 48, a wireless transmitter 49, and a monitor (display) 50.

As described with reference to FIG. 4, the CPU 39 controls the navigation system to perform the map matching method of the present invention when the navigation system experiences the GPS signal loss at the same location recorded in the database. When the GPS signal is invalid, the CPU 39 starts the map matching method noted above by incorporating the specified factors (road class, road name, angle, accessibility, proximity, etc.) in addition to the measured data based on the dead reckoning processing.

As has been described above, according to the present invention, the map matching method and apparatus is able to accurately match the current vehicle position on the correct road segment. Thus, the map matching method of the present invention can avoid erroneous display of the current vehicle position on the wrong road even when the GPS signals are invalid for a relatively long period of time.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A map matching method for a navigation system, comprising the following steps of:

recording a pair of locations where a GPS signal was lost and recovered as previous locations in a memory when a user of a navigation system newly encounters GPS signal loss and its recovery;

comparing a current location of the user with the previous locations recorded in the memory and retrieving the pair of previous locations when the user is approaching the location where the GPS signal was previously lost;

selecting one or more candidate routes between the pair of previous locations retrieved from the memory when the user experiences the GPS signal loss in a second time by extrapolating between the pair of previous locations;

estimating a route out of the candidate routes which is most likely that the user is taking based on measured data through a dead reckoning process in addition to predetermined factors; and map matching a current location of the user with a road segment on the estimated route derived from a map database of the navigation system;

wherein the predetermined factors include, in addition to proximity with a road, at least a road class which indicates a type of road.

2. A map matching method for a navigation system as defined in claim 1, further comprising a step of creating a database of pairs of previous locations where the GPS signal was lost and recovered by repeating the step of recording the pair of locations in the memory every time when the navigation system newly encounters GPS signal loss and its recovery.

3. A map matching method for a navigation system as defined in claim 2, wherein each previous location where the GPS signal was lost and the GPS signal was recovered is recorded in the database by longitude and latitude data.

4. A map matching method for a navigation system as defined in claim 2, wherein the database includes data showing a number of times that each pair of previous locations where the GPS signal was lost and the GPS signal was recovered have been used so far for the map matching.

5. A map matching method for a navigation system as defined in claim 1, wherein the step of recording the pair of previous locations where the GPS signal was lost and recovered in the memory includes a step of selecting road segments within a predetermined range determined by GPS accuracy.

6. A map matching method for a navigation system as defined in claim 1, wherein the predetermined factors for estimating the route further include a speed range associated with a particular road class.

7. A map matching method for a navigation system as defined in claim 1, wherein the predetermined factors for estimating the route further include accessibility of a road which at least includes distinction whether a particular road is one-way or not.

8. A map matching method for a navigation system as defined in claim 1, wherein the predetermined factors for estimating the route further include an angle of road.

9. A map matching apparatus for a navigation system, comprising:

means for recording a pair of locations where a GPS signal was lost and recovered as previous locations in a memory when a user of a navigation system newly encounters GPS signal loss and its recovery;

means for comparing a current location of the user with the previous locations recorded in the memory and retrieving the pair of previous locations when the user is approaching the location where the GPS signal was lost previously;

means for selecting one or more candidate routes between the previous location where the GPS signal was lost and the previous location where the GPS signal was recovered retrieved from the memory when the user experiences the GPS signal loss in a second time;

means for estimating a route out of the candidate routes which is most likely that the user is taking based on measured data through a dead reckoning process in addition to predetermined factors; and means for map matching a current location of the user with a road segment on the estimated route derived from a map database of the navigation system;

wherein the predetermined factors include, in addition to proximity to a road, at least a road class which indicates a type of road.

10. A map matching apparatus for a navigation system as defined in claim 9, further comprising means for creating a database of pairs of previous locations where the GPS signal was lost and recovered by repeating a process recording the pair of locations in the memory every time when the navigation system newly encounters GPS signal loss and its recovery.

11. A map matching apparatus for a navigation system as defined in claim 10, wherein each previous location where the GPS signal was lost and the GPS signal was recovered is recorded in the database by longitude and latitude data.

12. A map matching apparatus for a navigation system as defined in claim 10, wherein the database includes data showing a number of times that each pair of previous locations where the GPS signal was lost and the GPS signal was recovered have been used for the map matching.

13. A map matching apparatus for a navigation system as defined in claim 9, wherein the means for recording the pair of previous locations where the GPS signal was lost and recovered in the memory includes means for selecting road segments within a predetermined range determined by GPS accuracy.

14. A map matching apparatus for a navigation system as defined in claim 9, wherein the predetermined factors for estimating the route further include a speed range associated with a particular road class.

15. A map matching apparatus for a navigation system as defined in claim 9, wherein the predetermined factors for estimating the route further include accessibility of a road which includes distinction whether a particular road is one-way or not.

16. A map matching apparatus for a navigation system as defined in claim 9, wherein the predetermined factors for estimating the route further include an angle of road.

* * * * *